US012360706B2

(12) United States Patent
Cai et al.

(10) Patent No.: US 12,360,706 B2
(45) Date of Patent: Jul. 15, 2025

(54) DATA PROCESSING METHOD AND SYSTEM BASED ON MULTI-LEVEL CACHE

(71) Applicant: SHANGHAI BILIBILI TECHNOLOGY CO., LTD., Shanghai (CN)

(72) Inventors: Shangzhi Cai, Shanghai (CN); Sheng Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/682,729

(22) PCT Filed: Jun. 14, 2022

(86) PCT No.: PCT/CN2022/098669
§ 371 (c)(1),
(2) Date: Feb. 9, 2024

(87) PCT Pub. No.: WO2023/020085
PCT Pub. Date: Feb. 23, 2023

(65) Prior Publication Data
US 2024/0345776 A1    Oct. 17, 2024

(30) Foreign Application Priority Data
Aug. 20, 2021   (CN) .................. 202110963175.2

(51) Int. Cl.
*G06F 3/06*    (2006.01)
(52) U.S. Cl.
CPC .......... *G06F 3/0659* (2013.01); *G06F 3/0604* (2013.01); *G06F 3/0683* (2013.01)
(58) Field of Classification Search
CPC .... G06F 3/0659; G06F 3/0604; G06F 3/0683; G06F 3/067; G06F 3/0614
(Continued)

(56) References Cited

U.S. PATENT DOCUMENTS

| 9,559,961 | B1 * | 1/2017 | Sorenson, III | ........ H04L 47/125 |
| 2014/0310390 | A1 * | 10/2014 | Sorenson, III | .......... H04L 47/10 |
| | | | | 709/223 |

(Continued)

FOREIGN PATENT DOCUMENTS

| CN | 102843403 A | 12/2012 |
| CN | 107707631 A | 2/2018 |

(Continued)

OTHER PUBLICATIONS

International Patent Application No. PCT/CN2022/098669; Int'l Search Report; dated Jul. 27, 2022; 3 pages.

(Continued)

*Primary Examiner* — Than Nguyen
(74) *Attorney, Agent, or Firm* — BakerHostetler

(57) ABSTRACT

A multilevel-cache-based data processing method is provided, which is applied to a server computing device. The server computing device includes a first-level cache and a second-level cache. The first-level cache includes a plurality of first-type storage nodes. The second-level cache includes a plurality of second-type storage nodes. The data processing method includes identifying a target node based on a current hash ring in response to receiving a read request; determining whether the target node is any one of the plurality of first-type storage nodes; and in response to determining that the target node is not any one of the plurality of first-type storage nodes, reading response data from the plurality of second-type storage nodes for responding to the read request, and returning the response data. According to the method, a speed of responding to the read request can be increased, and pressure of the first-level cache can be reduced.

20 Claims, 9 Drawing Sheets

(58) Field of Classification Search
USPC .................................................. 711/118, 147
See application file for complete search history.

(56) References Cited

U.S. PATENT DOCUMENTS

| | | | | |
|---|---|---|---|---|
| 2014/0310391 | A1* | 10/2014 | Sorenson, III | H04L 43/0817 709/223 |
| 2017/0318114 | A1 | 11/2017 | Smith et al. | |
| 2020/0034050 | A1* | 1/2020 | Brasfield | G06F 12/084 |
| 2020/0326981 | A1* | 10/2020 | Pfister | H04L 9/0643 |

FOREIGN PATENT DOCUMENTS

| CN | 108762664 | A | | 11/2018 | |
|---|---|---|---|---|---|
| CN | 108810041 | A | | 11/2018 | |
| CN | 110096227 | | * | 8/2019 | ........... G06F 16/901 |
| CN | 110096227 | A | | 8/2019 | |
| CN | 110737668 | A | | 1/2020 | |
| CN | 110858201 | A | | 3/2020 | |
| CN | 111125093 | A | | 5/2020 | |
| CN | 111858607 | A | | 10/2020 | |
| CN | 112162987 | A | | 1/2021 | |
| CN | 112230861 | A | | 1/2021 | |
| CN | 112486672 | A | | 3/2021 | |
| CN | 112988680 | A | | 6/2021 | |
| CN | 113672524 | A | | 11/2021 | |
| WO | WO 2018/099107 | A1 | | 6/2018 | |
| WO | WO 2021/003935 | A1 | | 1/2021 | |

OTHER PUBLICATIONS

Xiangping et al.; "High performance inventory caching system based on memory mapping files"; Computer Technology and It's Applications; Jul. 2020; p. 113-126 (contains English Abstract).

Bingxu et al.; "DRC: A Dynamic-replacement-cost-based Algorithm for SSD/HDD Storage System"; Microcomputer Applications; vol. 31 No. 4; Apr. 2015; p. 15-18 (contains English Abstract).

* cited by examiner

DATA PROCESSING METHOD AND SYSTEM BASED ON MULTI-LEVEL CACHE

CROSS-REFERENCE TO RELATED APPLICATIONS

The present application is the U.S. National Stage of International Application No. PCT/CN2022/098669, filed on Jun. 14, 2022, which claims priority to Chinese Patent Application No. 202110963175.2, filed on Aug. 20, 2021, and entitled "MULTILEVEL-CACHE-BASED DATA PROCESSING METHOD AND SYSTEM", both of which are incorporated herein by reference in their entireties.

TECHNICAL FIELD

The present application relates to the field of computer technologies, and in particular, to a multilevel-cache-based data processing method and system, a computer device, and a computer-readable storage medium.

BACKGROUND ART

With the development of the Internet and a computer technology, a data scale is increasingly large. To cope with large-scale data writing or reading, people start to use a multilevel cache technology, to store data with different access frequencies in different levels of caches. For an access frequency, a read/write speed, storage device costs, and other factors, the different levels of caches generally use different types of storage devices. It is found by the inventor that a current multilevel cache is prone to performance waste.

SUMMARY OF THE INVENTION

Embodiments of the present application aim to provide a multilevel-cache-based data processing method and system, a computer device, and a computer-readable storage medium, to solve the following problem: a current multilevel cache is prone to performance waste.

An aspect of the embodiments of the present application provides a multilevel-cache-based data processing method applied to a server computing device. The server computing device includes a first-level cache and a second-level cache. The first-level cache includes a plurality of first-type storage nodes. The second-level cache includes a plurality of second-type storage nodes. The data processing method includes:
  selecting a target node through a current hash ring in response to a read request;
  determining whether the target node is any one of the plurality of first-type storage nodes; and
  if the target node is not any one of the plurality of first-type storage nodes, reading, from the plurality of second-type storage nodes, response data for responding to the read request, and returning the response data.

Optionally, the method further includes: updating the current hash ring at a preset frequency.

Optionally, the current hash ring is a first hash ring. The updating the current hash ring at a preset frequency includes:
  updating the current hash ring from the first hash ring to a second hash ring based on a current status of each first-type storage node.

Optionally, the current status of each first-type storage node includes a current disk status value of each first-type storage node.

The updating the current hash ring from the first hash ring to a second hash ring based on a current status of each first-type storage node includes:
  constructing a new hash ring;
  generating the second hash ring based on the new hash ring and the current disk status value of each first-type storage node; and
  updating the current hash ring from the first hash ring to the second hash ring.

Optionally, the obtaining the current disk status value of each first-type storage node includes:
  obtaining the current disk status value of each first-type storage node based on an IO queue and a request latency of each first-type storage node.

Optionally, the obtaining the current disk status value of each first-type storage node based on an IO queue and a request latency of each first-type storage node includes:
  determining whether a number of IO queues of an $i^{th}$ storage node is greater than a first preset value, where the $i^{th}$ storage node is any one of the plurality of first-type storage nodes, $1 \leq i \leq M$, i is an integer, and M is a number of the plurality of first-type storage nodes;
    if the number of IO queues of the $i^{th}$ storage node is greater than the first preset value, decrementing a current disk status value of the $i^{th}$ storage node by 1; or
    if the number of IO queues of the $i^{th}$ storage node is not greater than the first preset value, obtaining a request latency of the $i^{th}$ storage node; and
    if the request latency of the $i^{th}$ storage node is greater than a second preset value, decrementing the current disk status value of the $i^{th}$ storage node by 1; or
    if the request latency of the $i^{th}$ storage node is not greater than a second preset value, incrementing the current disk status value of the $i^{th}$ storage node by 1.

Optionally, the generating the second hash ring based on the new hash ring and the current disk status value of each first-type storage node includes:
  separately inserting node information of the $i^{th}$ storage node to N positions of the new hash ring based on the current disk status value of the $i^{th}$ storage node, where a value of N is equal to the current disk status value of the $i^{th}$ storage node, the $i^{th}$ storage node is any one of the plurality of first-type storage nodes, $1 \leq i \leq M$, i is an integer, and M is the number of the plurality of first-type storage nodes.

Optionally, the server computing device further includes an internal memory. The selecting a target node through a current hash ring in response to a read request includes:
  determining, based on the read request, whether there is the response data in the internal memory; and
    if there is not the response data in the internal memory, determining the target node through the current hash ring.

Optionally, the method further includes:
  if the target node is a first-type storage node, determining whether there is the response data in the target node; and
  if there is the response data in the target node, reading the response data from the target node; or
  if there is not the response data in the target node, reading the response data from the second-level cache.

Optionally, the plurality of first-type storage nodes are correspondingly a plurality of SSD disks. The plurality of second-type storage nodes are correspondingly a plurality of HDD disks.

An aspect of the embodiments of the present application further provides a multilevel-cache-based data processing system applied to a server computing device. The server computing device includes a first-level cache and a second-level cache. The first-level cache includes a plurality of first-type storage nodes. The second-level cache includes a plurality of second-type storage nodes. The data processing system includes:
- a selection module configured to select a target node through a current hash ring in response to a read request;
- a determining module configured to determine whether the target node is any one of the plurality of first-type storage nodes; and
- a returning module configured to: if the target node is not any one of the plurality of first-type storage nodes, read, from the plurality of second-type storage nodes, response data for responding to the read request, and return the response data.

An aspect of the embodiments of the present application further provides a computer device, including a memory, a processor, and computer-readable instructions stored on the memory and capable of running on the processor. When the processor executes the computer-readable instructions, the steps of the foregoing multilevel-cache-based data processing method are implemented.

An aspect of the embodiments of the present application further provides a computer-readable storage medium having computer-readable instructions stored thereon. The computer-readable instructions may be executed by at least one processor to cause the at least one processor to perform the steps of the foregoing multilevel-cache-based data processing method.

According to the multilevel-cache-based data processing method and system, the device, and the computer-readable storage medium provided in the embodiments of the present application,
- if the target node is not any one of the plurality of first-type storage nodes, it indicates that there is possibly the following case. In the current hash ring, a placeholder node (invalid node) occupies a relatively large number of positions, and the plurality of first-type storage nodes occupy a relatively small number of positions. This means that the first-level cache is busy now. Therefore, in this case, the read request does not wait in a queue of the first-level cache, and instead, the read request is directed to the second-level cache, and the second-level cache responds. According to the solution in the embodiments, a speed of responding to the read request can be increased, and pressure of the first-level cache can be reduced.

DETAILED DESCRIPTION OF EMBODIMENTS

Figure 1:
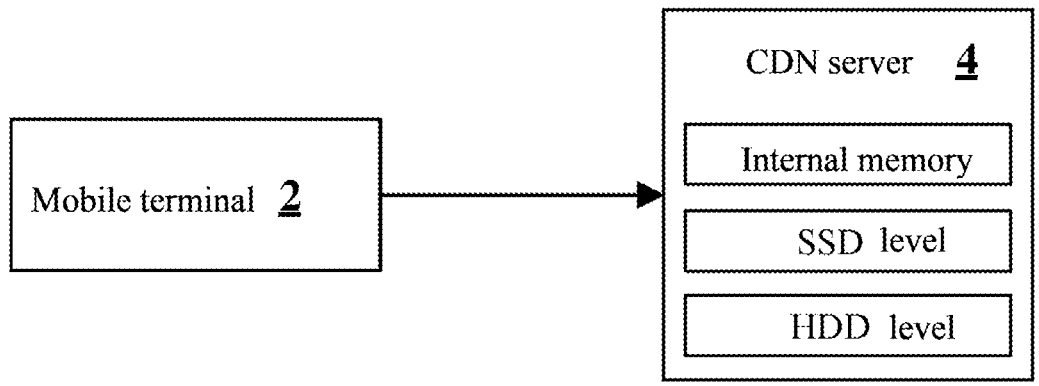
FIG. 1 is a diagram schematically showing an application environment of a multilevel-cache-based data processing method according to an embodiment of the present application.

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely for the illustrative purpose, and should not be construed as indicating or implying the relative importance thereof or implicitly indicating the number of technical features indicated. Therefore, a feature defined by "first" or "second" may explicitly or implicitly include at least one such feature. In addition, technical solutions in various embodiments may be combined with each other, provided that they can be implemented by those of ordinary skill in the art. When a combination of the technical solutions incurs conflict or cannot be implemented, it should be considered that such a combination of the technical solutions does not exist, and does not fall within the claimed scope of protection of the present application either.

In the description of the present application, it should be understood that the reference numerals of steps do not indicate the order of execution of the steps, but are merely to facilitate the description of the present application and differentiation between the steps, and thus will not be interpreted as limiting the present application.

Terms in the present application are explained below.

Content delivery network (CDN) server computing device: it is an edge server computing device deployed in each region. Through function modules of a central platform for load balancing, content delivery, scheduling, and the like, the CDN server computing device may enable a user to obtain required content nearby, to reduce network congestion and increase a user access response speed and a hit rate.

Solid state disk or solid state drive (SSD): it is generally a solid state drive.

Hard disk drive (HDD): it is generally a mechanical hard drive.

Consistent hashing/Hash ring: it is a special hash algorithm for a purpose of solving a problem of a distributed cache. When a server computing device is removed or added, an existing mapping relationship between a service request and a request processing server computing device can be changed minimally. The hash ring may represent a disk structure or a disk mapping of the distributed cache.

Placeholder value: it occupies a node in a consistent hash ring, indicates a null value or an invalid value, and is used for directing overflow traffic into an HDD.

Q value: it is an upper limit value (usually 128) of an IO queue.

L value: it is a latency upper limit of a disk read/write task. It is generally considered that exceeding this value may affect user experience (this value is usually 500 milliseconds).

$99^{th}$ percentile: it is a numerical value at a 99% position in data sorting.

IO queue: it is a task queue that is currently executed by a disk.

With the development of the Internet and a computer technology, a data scale is increasingly large. To cope with large-scale data writing or reading, people start to use a multilevel cache technology, to store data with different access frequencies in different levels of caches. For an access frequency, a read/write speed, storage device costs, and other factors, the different levels of caches generally use different types of storage devices. It is found by the inventor that a current multilevel cache is prone to performance waste.

For example, a three-level cache the inventor knows includes an internal memory, an SSD level, and an HDD level.

A process of responding to an access request is as follows: The internal memory is traversed to query response data; if query in the internal memory fails, the SSD level is traversed to find the response data; and if query in the SSD level fails, the HDD level is queried.

The foregoing process has the following problems.

There is an uncertainty as to a performance ratio of the combined HDD level to the combined SSD level. The following factors cause the uncertainty: A number of HDDs is far greater than that of SSDs, some SSDs are removed due to a failure, performance of the SSDs is reduced by wear, and performance of the HDD level in which data is arranged elaborately is not lower but even higher than that of the SSD level. Overflow traffic of the SSD level waits in a queue until a task before the overflow traffic is completed. If a specified timeout is less than a waiting and execution time, performance of the SSD level may be wasted, and user experience may be affected.

In view of this, the present application aims to provide a multilevel-cache-based data processing technology. Specifically, request traffic of the SSD level may be dynamically adjusted based on a status of the SSD level, to ensure service quality. For example, an IO queue and a request latency of each SSD is periodically detected to calculate a current status of each SSD, to adjust a consistent hash ring of the SSD (that is, generate a new hash ring to replace an old hash ring), and the new hash ring is used to perform cache control, to control a proportion of the request traffic of the SSD level.

FIG. 1 is a schematic diagram schematically showing an application of a multilevel-cache-based data processing method according to Embodiment 1 of the present application. As shown in the figure, a mobile terminal 2 may access a CDN server computing device 4 through one or more networks.

The mobile terminal 2 may be any type of computing device, for example, a smartphone, a tablet device, or a laptop computer. The mobile terminal 2 may access the server computing device 4 through a browser or a special program to obtain content, and present the content to a user. The content may include a video, audio, a comment, text data, and/or the like.

The one or more networks include various network devices, for example, routers, switches, multiplexers, hubs, modems, network bridges, repeaters, firewalls, and/or proxy devices. The one or more networks may include physical links, for example, coaxial cable links, twisted-pair cable links, optical fiber links, and a combination thereof. The network may include a wireless link, for example, a cellular link, a satellite link, or a Wi-Fi link.

The CDN server computing device 4 may be configured as a multilevel cache, for example,
- a two-level cache that may include an HDD level and an SSD level, or
- a three-level cache that may include an HDD level, an SSD level, and an internal memory.

The present application provides a plurality of embodiments to describe the multilevel-cache-based data processing technology, which is specifically as follows.

Embodiment 1

Embodiment 1 provides a multilevel-cache-based data processing method. The method may be performed in a server computing device (for example, the CDN server computing device 4). The server computing device includes a first-level cache and a second-level cache. The first-level cache includes a plurality of first-type storage nodes. The second-level cache includes a plurality of second-type storage nodes.

As an example, the first-level cache and the second-level cache provide differentiated services. Compared with the second-level cache, the first-level cache may preferentially cache data with a high access frequency, to improve service efficiency and quality. Correspondingly, the first-type storage node and the second-type storage node provide differentiated read/write performance. For example, the plurality of first-type storage nodes are correspondingly a plurality of SSD disks; and the plurality of second-type storage nodes are correspondingly a plurality of HDD disks.

Figure 2:
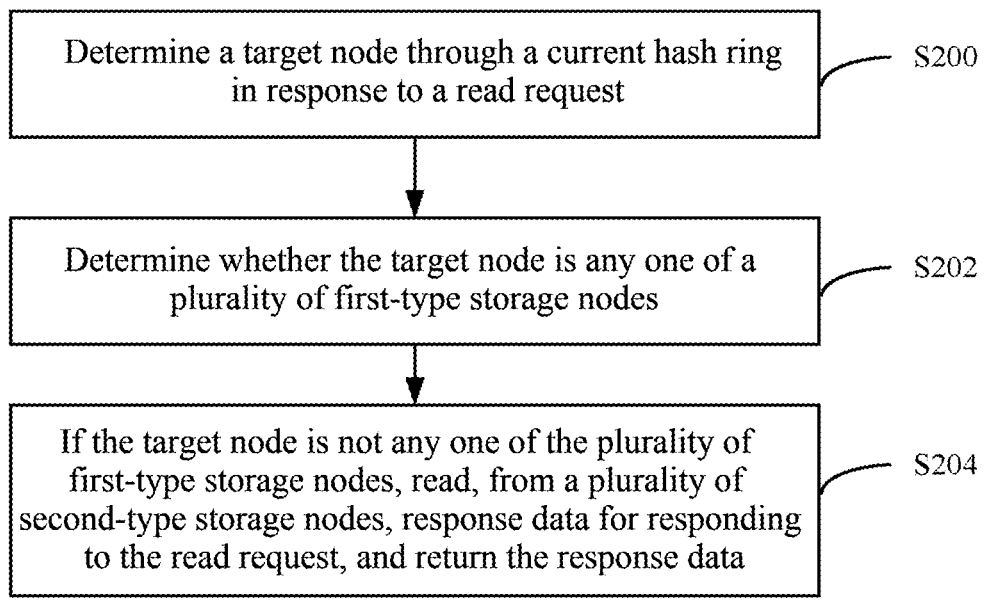
FIG. 2 is a flowchart schematically showing a multilevel-cache-based data processing method according to Embodiment 1 of the present application.

FIG. 2 is a flowchart schematically showing the multilevel-cache-based data processing method according to Embodiment 1 of the present application. As shown in FIG. 2, the multilevel-cache-based data processing method may include steps S200 to S204.

In step S200, a target node is selected through a current hash ring in response to a read request.

A user may send the read request to the server computing device through a mobile terminal, so as to obtain corresponding data from the server computing device. For example, the user may request the server computing device for obtaining user data, a video, or a text.

As an example, the target node being selected through the current hash ring may be implemented through the following steps. In (1), a resource identifier of a request file is obtained. In (2), calculation is performed based on the resource identifier and a preset hash algorithm to obtain a hash value. In (3), the target node is determined in the current hash ring based on the hash value.

In this embodiment, storage information of each first-type storage node is inserted and updated to the current hash ring. Therefore, the current hash ring may represent a current disk mapping of each first-type storage node.

Specifically, the current hash ring corresponds to a placeholder node and each first-type storage node. Each first-type storage node may occupy one position (hash slot) of the current hash ring, may occupy a plurality of positions at the same time, or certainly, may not occupy any position. A first-type storage node that does not occupy any position is not in the current hash ring. There is a higher probability that a first-type storage node that occupies a larger number of positions is selected.

In step S202, whether the target node is any one of the plurality of first-type storage nodes is determined.

As described above, the current hash ring corresponds to the placeholder node. The placeholder node is an invalid node. A placeholder value of the placeholder node is a null value or an invalid value, and is used for directing overflow traffic (some read requests) to the second-level cache.

In step S204, if the target node is not any one of the plurality of first-type storage nodes, response data for responding to the read request is read from the plurality of second-type storage nodes, and the response data is returned.

If the target node is not any one of the plurality of first-type storage nodes, it may indicate that the target node is a placeholder node. Therefore, the read request may be directed to the second-level cache. The second-level cache may query, based on the read request, whether there is the response data inside the second-level cache. If there is the response data, the response data is returned to the mobile terminal; or if there is not the response data, failure or blank information is returned, or when the server computing device is configured with a third-level cache, the read request is directed to the third-level cache.

According to the multilevel-cache-based data processing method provided in this embodiment,
if the target node is not any one of the plurality of first-type storage nodes, it indicates that there is possibly the following case. In the current hash ring, a placeholder node occupies a relatively large number of positions, and the plurality of first-type storage nodes occupy a relatively small number of positions. This means that the first-level cache is busy now. Therefore, in this case, the read request does not wait in a queue of the first-level cache, and instead, the read request is directed to the second-level cache, and the second-level cache responds. According to the method in this embodiment, a speed of responding to the read request can be increased, and pressure of the first-level cache can be reduced.

This embodiment is particularly applicable to the following case:

There is an uncertainty as to a performance ratio of the combined second-level cache to the combined first-level cache. The following factors cause the uncertainty: A number of disks in the second-level cache is far greater than a number of disks in the first-level cache, some first-type storage nodes are removed due to a failure, performance of some first-type storage nodes is reduced by wear, and performance of the second-level cache in which data is arranged elaborately is not lower but even higher than that of the first-level cache.

In this case, if the first-level cache is busy, the read request still waits in a queue until a task before the read request is completed. After the task before the read request is completed, the first-level cache performs query and responding. This may certainly reduce the response speed.

In this case, the read request may be directly directed to the second-level cache, and the second-level cache responds quickly.

It should be noted that in this embodiment, the read request is directed to the second-level cache only when it is determined that the target node is not any one of the first-type storage nodes in the first-level cache, so that performance waste of the first-level cache is avoided, for example, performance waste caused in the following manner. A timeout of directing to the second-level cache is set, which may be less than waiting and execution time, resulting in performance waste of a first-level cache.

The following provides some optional solutions.

As an example, the method may further include: updating the current hash ring at a preset frequency. In this embodiment, the current hash ring is periodically updated to obtain a latest status of each first-type storage node in the first-level cache, so as to improve effectiveness of selection. For example, an idler first-type storage node occupies a larger number of positions in the current hash ring, so that the first-type storage node is more likely to be selected. Correspondingly, a busier first-type storage node occupies a smaller number of positions in the current hash ring, so that the first-type storage node is more unlikely to be selected.

Figure 3:
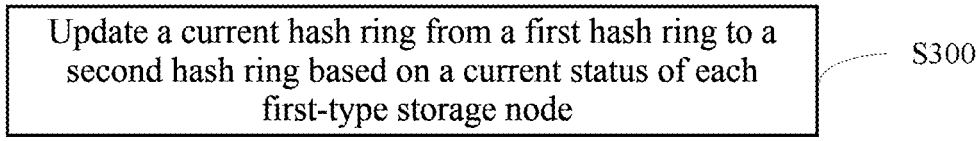
FIG. 3 is a flowchart schematically showing a newly added step of the multilevel-cache-based data processing method according to Embodiment 1 of the present application.

As an example, the current hash ring is a first hash ring. As shown in FIG. 3, updating the current hash ring at the preset frequency may be implemented through the following operation. In step S300, the current hash ring is updated from the first hash ring to a second hash ring based on a current status of each first-type storage node. In this embodiment, the current status may be a working status of the corresponding first-type storage node. Updating the current hash ring is updating, based on a working status of each first-type storage node, a probability that each first-type storage node is selected.

Figure 4:
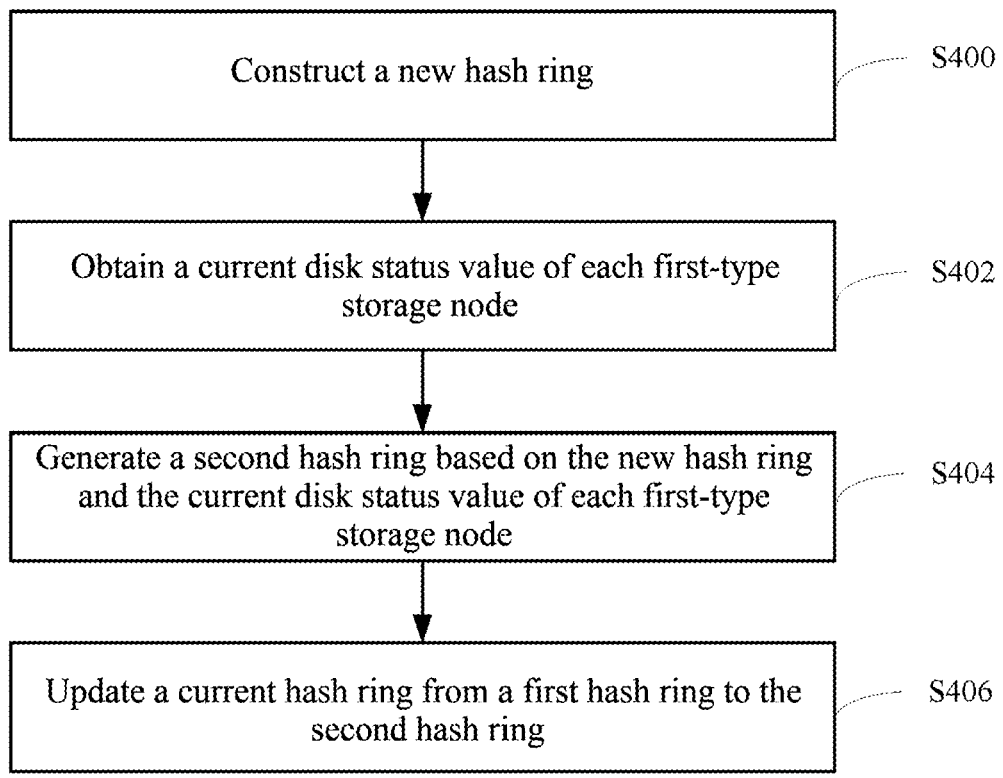
FIG. 4 is a diagram schematically showing substeps of step S300 in FIG. 3.

As an example, the current status of each first-type storage node includes a current disk status value of each first-type storage node. A disk status value of each first-type storage node when the server computing device starts a service may be an initial value 50 or another value. As shown in FIG. 4, the current hash ring being updated from the first hash ring to the second hash ring based on the current status of each first-type storage node may be implemented through the following operations. In step S400, a new hash ring is constructed. In step S402, the current disk status value of each first-type storage node is obtained. In step S404, the second hash ring is generated based on the new hash ring and the current disk status value of each first-type storage node. In step S406, the current hash ring is updated from the first hash ring to the second hash ring. It should be noted that the new hash ring is further inserted with a placeholder value after step S400 is performed. In this embodiment, the new hash ring may be effectively constructed, so that the target node can be more effectively selected based on an actual situation.

Figure 5:
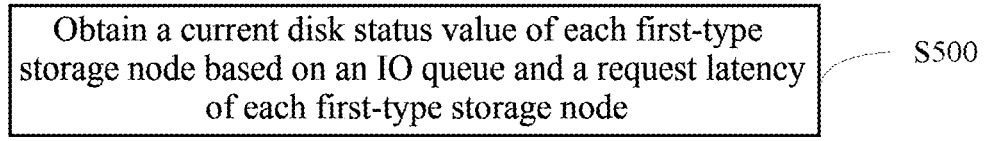
FIG. 5 is a diagram schematically showing a substep of step S402 in FIG. 4.

As an example, as shown in FIG. 5, the current disk status value of each first-type storage node being obtained may be implemented through the following operation. In step S500, the current disk status value of each first-type storage node is obtained based on an IO queue and a request latency of each first-type storage node. In this embodiment, the working status of each first-type storage node (for example, whether the first-type storage node is busy) may be determined based on the IO queue, the request latency, and the like, so as to more effectively update the current disk status value of each first-type storage node to obtain a more effective new hash ring (that is, the second hash ring). Therefore, effectiveness of the second hash ring is ensured, and response efficiency is improved.

Figures 6, 7:
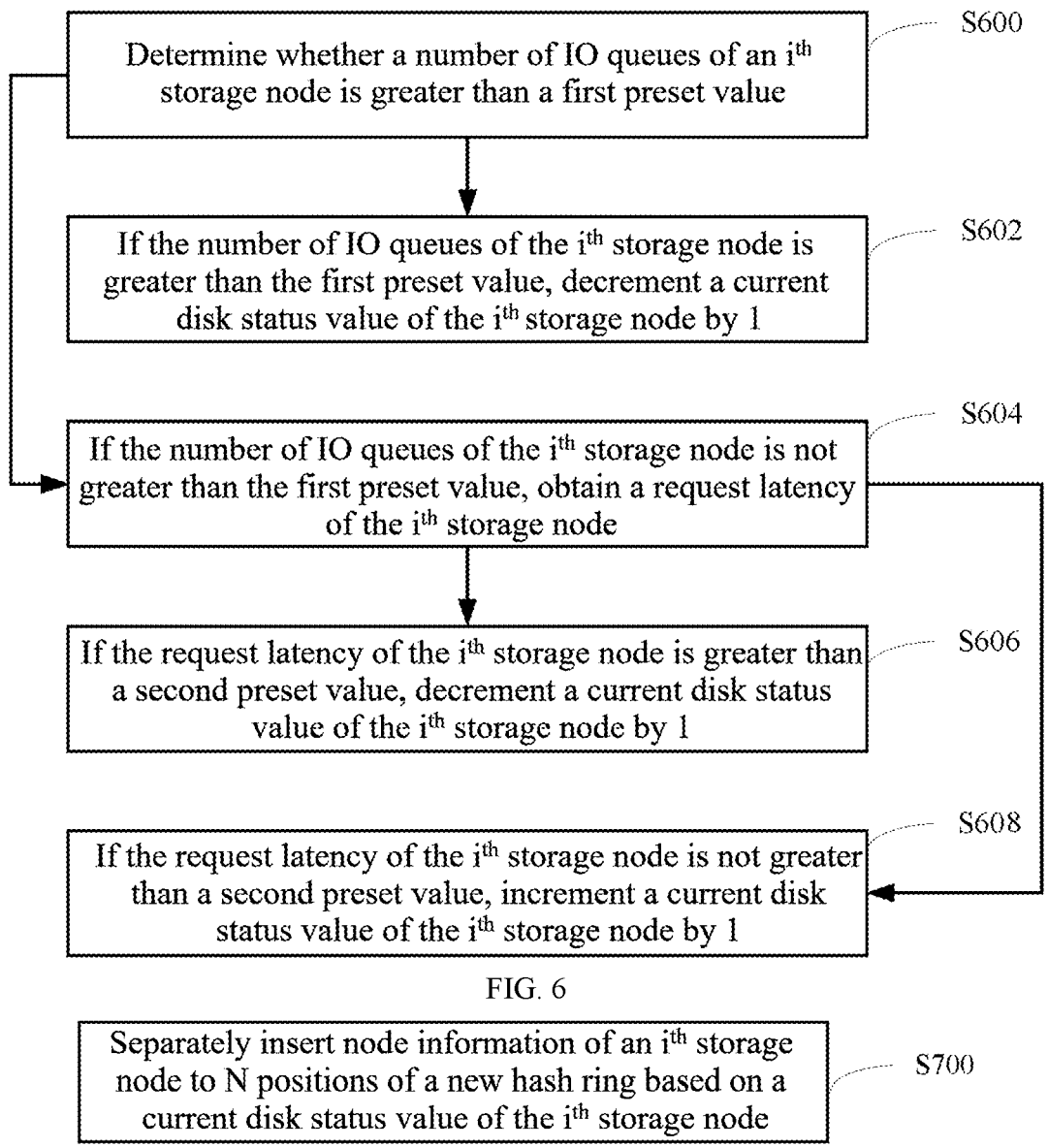
FIG. 6 is a diagram schematically showing substeps of step S500 in FIG. 5.
FIG. 7 is a diagram schematically showing a substep of step S404 in FIG. 4.

As an example, as shown in FIG. 6, the current disk status value of each first-type storage node being obtained based on the IO queue and the request latency of each first-type storage node may be implemented through the following operations. In step S600, whether a number of IO queues of an $i^{th}$ storage node is greater than a first preset value is determined, where the $i^{th}$ storage node is any one of the plurality of first-type storage nodes, $1 \le i \le M$, i is an integer, and M is a number of the plurality of first-type storage nodes. In step S602, if the number of IO queues of the $i^{th}$ storage node is greater than the first preset value, a current disk status value of the $i^{th}$ storage node is decremented by 1. In step S604, if the number of IO queues of the $i^{th}$ storage node is not greater than the first preset value, a request latency of the $i^{th}$ storage node is obtained. In step S606, if the request latency of the $i^{th}$ storage node is greater than a second preset value, the current disk status value of the $i^{th}$ storage node is decremented by 1. In step S608, if the request latency of the $i^{th}$ storage node is not greater than a second preset value, the current disk status value of the $i^{th}$ storage node is incremented by 1. In this embodiment, if an initial disk status of the $i^{th}$ storage node is set to 50, the first preset value may be 100, and the second preset value may be 0. Based on the foregoing content, each time the current hash ring is updated, the current disk status value of the $i^{th}$ storage node may be incremented by 1, may be decremented by 1, or remain unchanged. Such an increment or a decrement is performed based on a disk status value in a previous period. Such gradual adjustment based on the previous period ensures stability of the current hash ring and data processing stability.

As an example, as shown in FIG. 7, the second hash ring being generated based on the new hash ring and the current disk status value of each first-type storage node may be implemented through the following operation. In step S700, node information of the $i^{th}$ storage node is separately inserted to N positions of the new hash ring based on the current disk status value of the $i^{th}$ storage node, where a value of N is equal to the current disk status value of the $i^{th}$ storage node, the $i^{th}$ storage node is any one of the plurality of first-type storage nodes, $1 \le i \le M$, i is an integer, and M is the number of the plurality of first-type storage nodes. In this embodiment, a larger current disk status value of the $i^{th}$ storage node indicates that the $i^{th}$ storage node is idler. Therefore, the $i^{th}$ storage node occupies a larger number of positions in the hash ring. When a read request is received, the $i^{th}$ storage node is more likely to be selected for full use in providing a response service.

Figure 8:
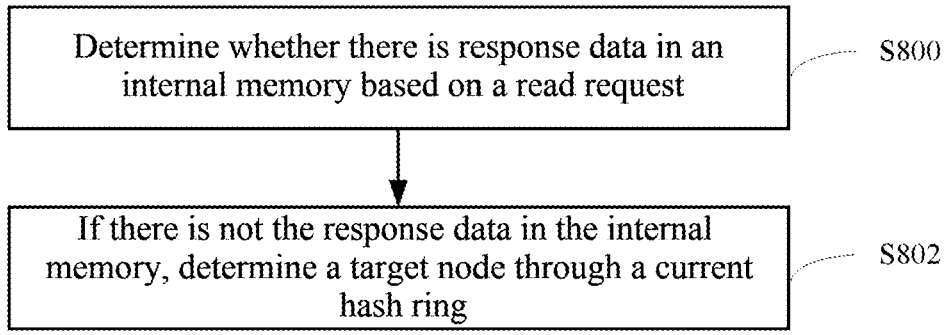
FIG. 8 is a diagram schematically showing substeps of step S200 in FIG. 2.

As an example, the server computing device is configured with a three-level cache, that is, includes an internal memory, a first-level cache, and a second-level cache. As shown in FIG. 8, the target node being selected through the current hash ring in response to the read request may be implemented through the following operations. In step S800, whether there is the response data in the internal memory is determined based on the read request. In step S802, if there is not the response data in the internal memory, the target node is determined through the current hash ring. In this embodiment, data with a highest access frequency may be stored in the internal memory, so that the server computing device can respond to the read request of the user more quickly.

Figure 9:
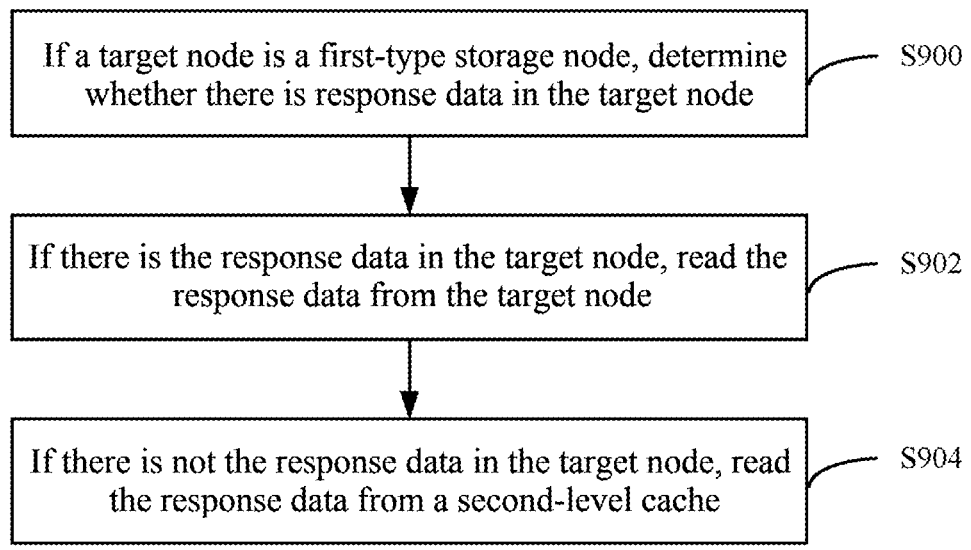
FIG. 9 is a flowchart schematically showing newly added steps of the multilevel-cache-based data processing method according to Embodiment 1 of the present application.

As an example, as shown in FIG. 9, the method may further include the following steps. In step S900, if the target node is a first-type storage node, whether there is the response data in the target node is determined. In step S902, if there is the response data in the target node, the response data is read from the target node. In step S904, if there is not the response data in the target node, the response data is read from the second-level cache. In this embodiment, when there is not the response data in the target node, the read request is directed to the second-level cache, and the second-level cache responds. In this way, a user requirement is met, and user experience is improved.

Figure 10:
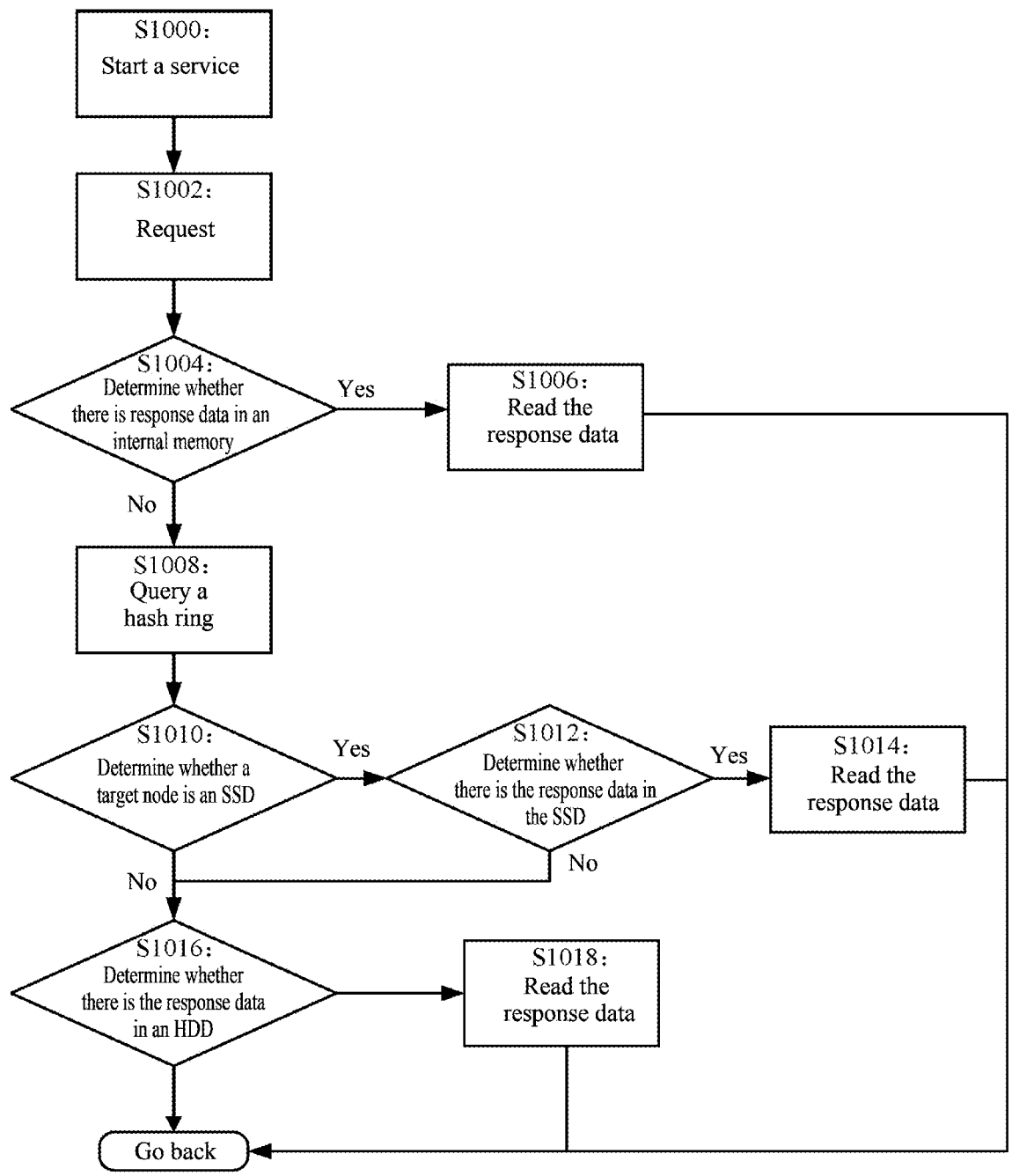
FIG. 10 is a flowchart schematically showing steps of an application example of a multilevel-cache-based data processing method.

For ease of understanding, the following provides an application example with reference to FIG. 10.

The application example is used in a CDN server computing device. The CDN server computing device includes an internal memory, an SSD level, and an HDD level. The internal memory may include a volatile storage medium with high-speed access performance, for example, a RAM. The SSD level includes a plurality of SSDs. The SDD level includes a plurality of mechanical hard drives.

In S1000, the CDN server computing device starts a read/write service, and initializes each SSD in the SSD level.

For example, a disk status value of each SSD may be set to an initial value 50 when the service is started. It should be noted that the disk status value of each SSD may be used as a basis for subsequent hash value update.

In S1002, the CDN server computing device receives a read request sent by a user.

In S1004, the CDN server computing device determines, based on the read request, whether there is response data in the internal memory. If there is the response data in the internal memory, step S1006 is performed; or if there is not the response data in the internal memory, step S1008 is performed.

In S1006, the response data is read from the internal memory, and the response data is returned to the user. The process ends.

In S1008, the CDN server computing device determines a target node through a current hash ring.

The current hash ring is used for representing a disk structure or a disk mapping of the CDN server computing device.

In S1010, the CDN server computing device determines whether the target node is an SSD.

If the target node is an SSD, step S1012 is performed; or if the target node is not an SSD, step S1016 is performed.

The hash ring includes a placeholder node. If the target node is the placeholder node, it is determined that the target node is not an SSD.

In S1012, the CDN server computing device determines whether there is the response data in the target node.

If there is the response data in the target node, step S1014 is performed; or if there is not the response data in the target node, step S1016 is performed.

In S1014, the CDN server computing device reads the response data from the target node, and returns the response data. The process ends.

In S1016, the CDN server computing device queries whether there is the response data in the HDD level.

If there is the response data in the HDD level, step S1018 is performed; or if there is not the response data in the HDD level, a response failure is returned. The process ends.

In S1018, the CDN server computing device reads the response data from the HDD level, and returns the response data. The process ends.

Figure 11:
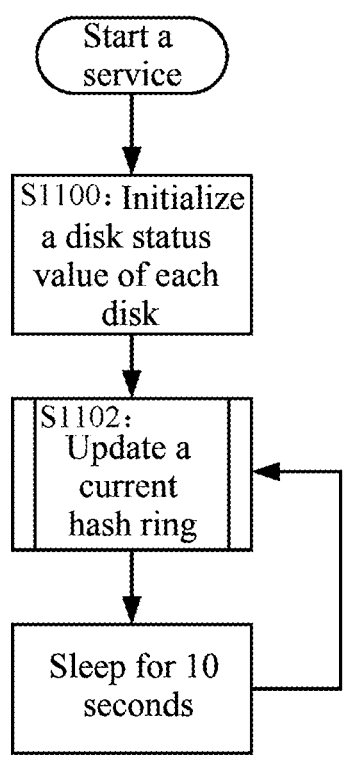
FIG. 11 is a flowchart schematically showing updating of a hash ring in FIG. 10.

As shown in FIG. 11, the CDN server computing device starts the read/write service, and updates the current hash ring at a preset period through the following operations.

In S1100, the disk status value of each SSD is set to the initial value 50.

In S1102, the hash ring is updated at the preset period, to update the current hash ring.

Figure 12:
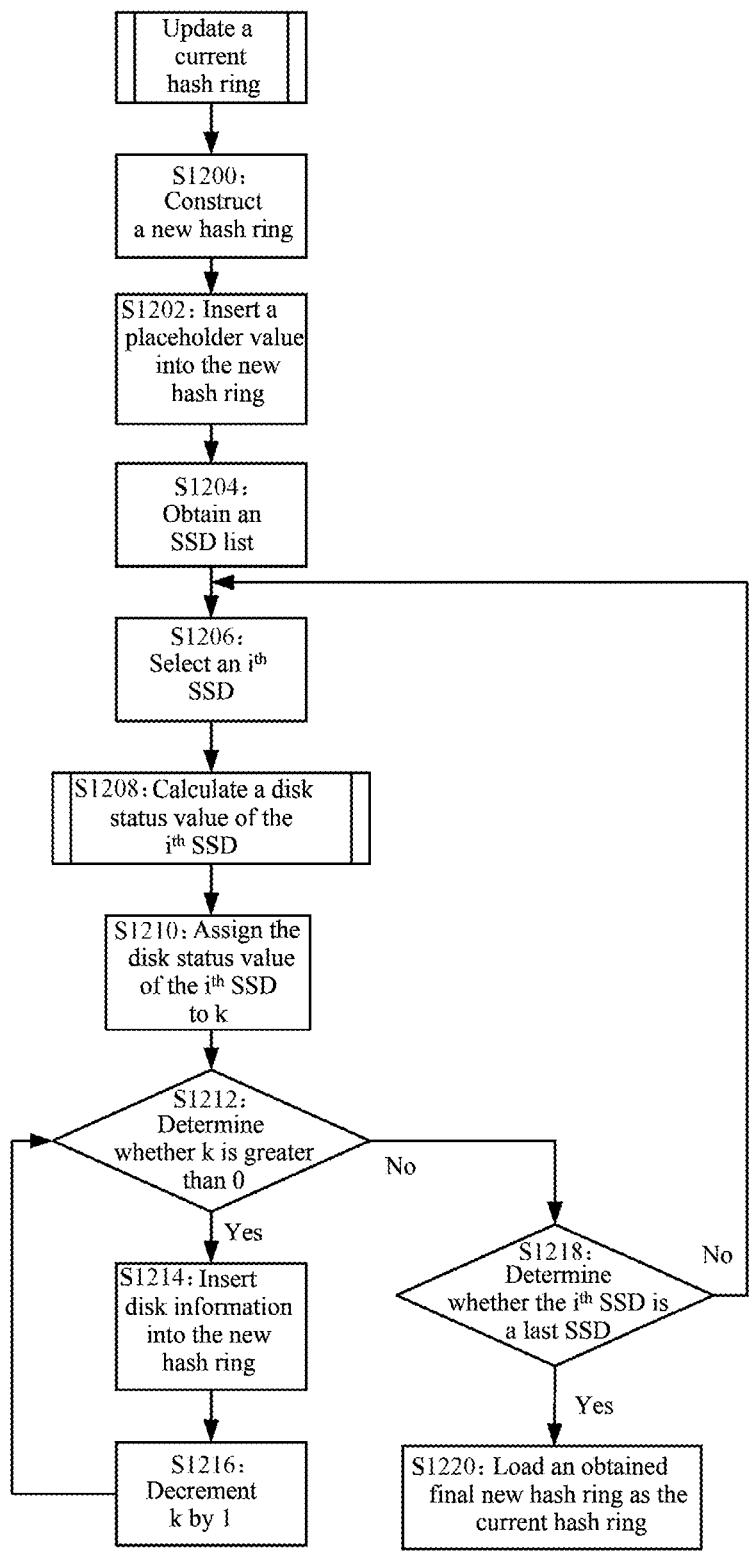
FIG. 12 is a flowchart schematically showing substeps of updating the hash ring in FIG. 11.

As shown in FIG. 12, for example, one update of the current hash ring may include the following steps.

In S1200, a new hash ring is constructed.

In S1202, a placeholder value is inserted into the new hash ring.

In S1204, an SSD list is obtained.

In S1206, an $i^{th}$ SSD is selected, where i is initially 1, and i is a positive integer.

In S1208, a disk status value of the $i^{th}$ SSD is calculated.

In S1210, the disk status value of the $i^{th}$ SSD is assigned to k, where k is a variable. A larger value of k indicates a larger number of times of inserting disk information of the $i^{th}$ SSD into the new hash ring and a higher probability that the $i^{th}$ SSD is selected.

In S1212, whether k is greater than 0 is determined. If k is greater than 0, step S1214 is performed; or if k is not greater than 0, step S1218 is performed.

In S1214, the disk information (for example, a disk identifier) of the $i^{th}$ SSD is inserted into the new hash ring.

In S1216, k is decremented by 1, and the process goes back to step S1212.

In S1218, whether the $i^{th}$ SSD is a last SSD in the SSD list is determined.

If the $i^{th}$ SSD is not the last SSD in the SSD list, a value of i is updated, and the process goes back to step S1206; or if the $i^{th}$ SSD is the last SSD in the SSD list, step S1220 is performed.

In S1220, after disk information of each SSD in the SSD list is inserted into the new hash ring through steps S1206 to S1218, an obtained final new hash ring (that is, a second hash ring) is loaded as the current hash ring.

Figure 13:
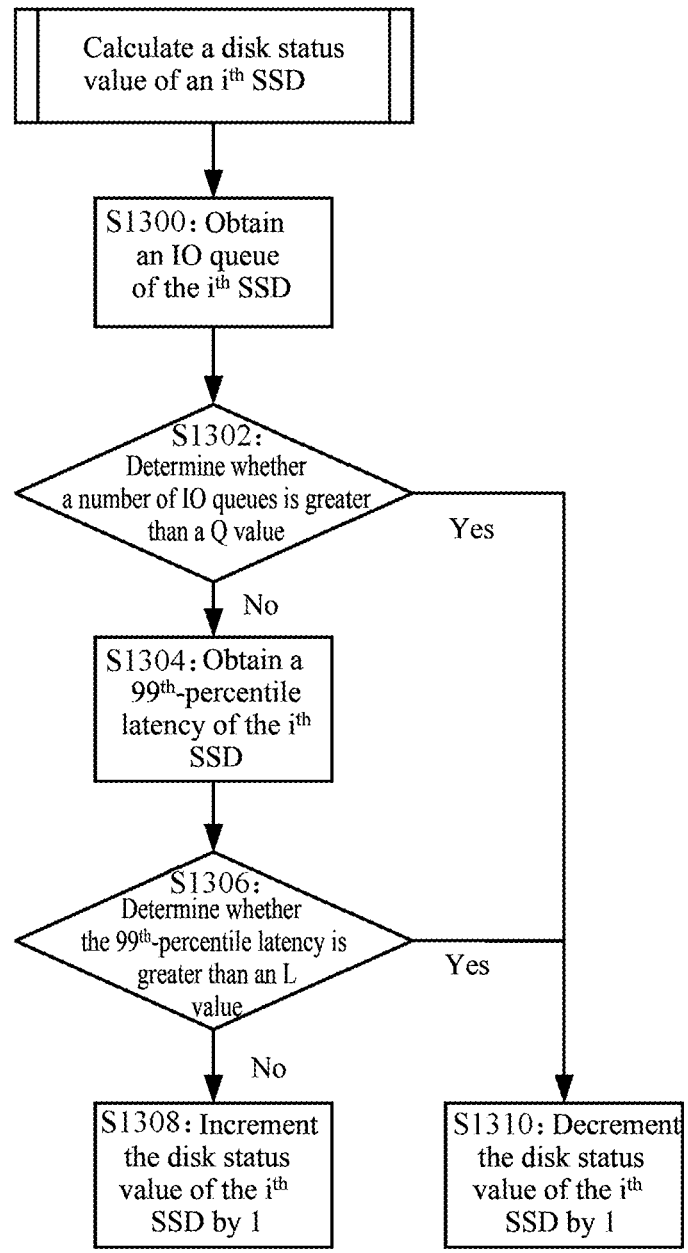
FIG. 13 is a flowchart schematically showing substeps of calculating a disk status value in FIG. 12.

As shown in FIG. 13, the disk status value of the $i^{th}$ SSD being calculated in step S1208 may include the following steps.

In S1300, an IO queue, for example, an average IO queue within a period of time, of the $i^{th}$ SSD is obtained.

In S1302, whether a number of IO queues is greater than a Q value is determined. The Q value is a preset upper limit value of the IO queue.

If the number of IO queues is greater than the Q value, step S1310 is performed; or if the number of IO queues is not greater than the Q value, step S1304 is performed.

In S1304, a 99th percentile latency of the $i^{th}$ SSD is obtained.

In S1306, whether the 99th percentile latency of the $i^{th}$ SSD is greater than an L value is determined. The L value is a preset latency upper limit value of a disk read/write task.

If the 99th percentile latency of the $i^{th}$ SSD is greater than the L value, step S1310 is performed; or if the 99th percentile latency of the $i^{th}$ SSD is not greater than the L value, S1308 is performed.

In S1308, the disk status value of the $i^{th}$ SSD is incremented by 1, to obtain a current disk status value.

It should be noted that a maximum value of the current disk status value is 100.

In S1310, the disk status value of the $i^{th}$ SSD is decremented by 1, to obtain the current disk status value.

It should be noted that a minimum value of the current disk status value is 0.

Embodiment 2

Figure 14:
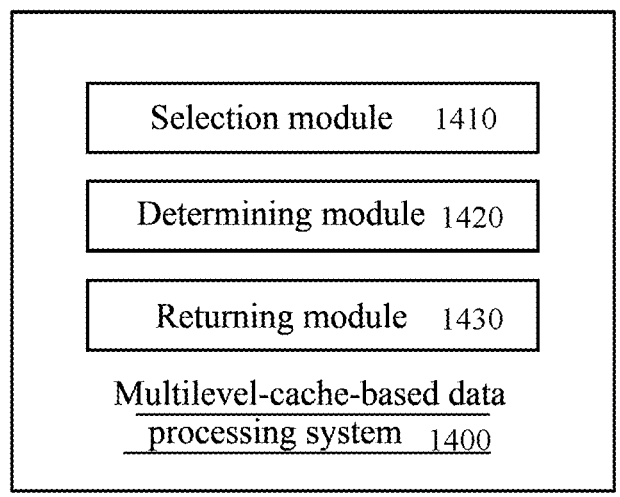
FIG. 14 is a block diagram schematically showing a multilevel-cache-based data processing system according to Embodiment 2 of the present application.

FIG. 14 is a block diagram schematically showing a multilevel-cache-based data processing system according to Embodiment 2 of the present application. The data processing system is applied to a server computing device. The server computing device includes a first-level cache and a second-level cache. The first-level cache includes a plurality of first-type storage nodes. The second-level cache includes a plurality of second-type storage nodes. The multilevel-cache-based data processing system may be divided into one or more program modules, and the one or more program modules are stored in a storage medium and executed by one or more processors, to implement the embodiments of the present application. The program modules referred to in the embodiments of the present application refer to a series of computer-readable instruction segments capable of implementing a specific function. The functions of various program modules in the embodiments will be specifically described in the following descriptions.

As shown in FIG. 14, the multilevel-cache-based data processing system 1400 may include a selection module 1410, a determining module 1420, and a returning module 1430.

The selection module 1410 is configured to select a target node through a current hash ring in response to a read request;

the determining module 1420 is configured to determine whether the target node is any one of the plurality of first-type storage nodes; and the returning module 1430 is configured to: if the target node is not any one of the plurality of first-type storage nodes, read, from the plurality of second-type storage nodes, response data for responding to the read request, and return the response data.

Optionally, the system further includes a hash ring updating module (not shown in the figure). The hash ring updating module is configured to: update the current hash ring at a preset frequency.

Optionally, the current hash ring is a first hash ring. The hash ring updating module is further configured to:

update the current hash ring from the first hash ring to a second hash ring based on a current status of each first-type storage node.

Optionally, the current status of each first-type storage node includes a current disk status value of each first-type storage node. The hash ring updating module is further configured to:

construct a new hash ring;

insert a placeholder value into the new hash ring;

obtain the current disk status value of each first-type storage node;

generate the second hash ring based on the new hash ring and the current disk status value of each first-type storage node; and update the current hash ring from the first hash ring to the second hash ring.

Optionally, the hash ring updating module is further configured to:

obtain the current disk status value of each first-type storage node based on an IO queue and a request latency of each first-type storage node.

Optionally, the hash ring updating module is further configured to:

determine whether a number of IO queues of an $i^{th}$ storage node is greater than a first preset value, where the $i^{th}$ storage node is any one of the plurality of first-type storage nodes, $1 \leq i \leq M$, i is an integer, and M is a number of the plurality of first-type storage nodes;

if the number of IO queues of the $i^{th}$ storage node is greater than the first preset value, decrement a current disk status value of the $i^{th}$ storage node by 1; or if the number of IO queues of the $i^{th}$ storage node is not greater than the first preset value, obtain a request latency of the $i^{th}$ storage node; and if the request latency of the $i^{th}$ storage node is greater than a second preset value, decrement the current disk status value of the $i^{th}$ storage node by 1; or if the request latency of the $i^{th}$ storage node is not greater than a second preset value, increment the current disk status value of the $i^{th}$ storage node by 1.

Optionally, the hash ring updating module is further configured to:

separately insert node information of the $i^{th}$ storage node to N positions of the new hash ring based on the current disk status value of the $i^{th}$ storage node, where a value of N is equal to the current disk status value of the $i^{th}$ storage node, the $i^{th}$ storage node is any one of the plurality of first-type storage nodes, $1 \leq i \leq M$, i is an integer, and M is the number of the plurality of first-type storage nodes.

Optionally, the server computing device further includes an internal memory. The selection module 1410 is further configured to:

determine, based on the read request, whether there is the response data in the internal memory; and if there is not the response data in the internal memory, determine the target node through the current hash ring.

Optionally, the returning module 1430 is further configured to:

if the target node is a first-type storage node, determine whether there is the response data in the target node; and if there is the response data in the target node, read the response data from the target node; or if there is not the response data in the target node, read the response data from the second-level cache.

Optionally, the plurality of first-type storage nodes are correspondingly a plurality of SSD disks. The plurality of second-type storage nodes are correspondingly a plurality of HDD disks.

Embodiment 3

Figure 15:
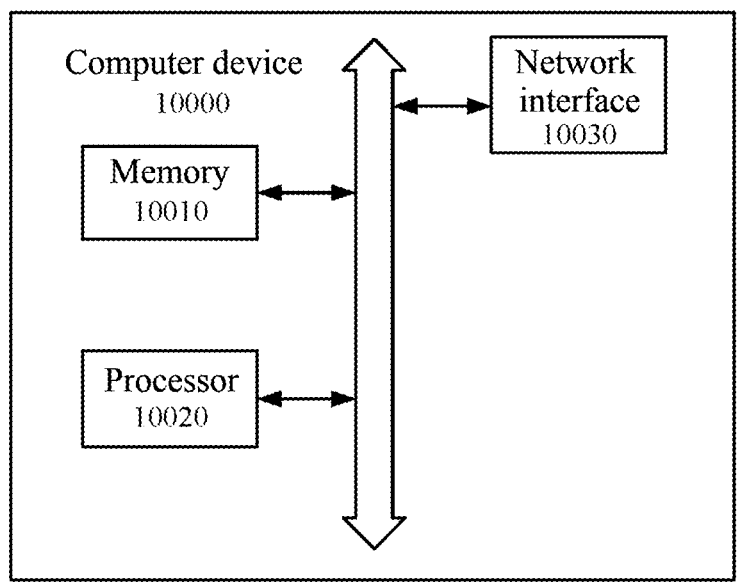
FIG. 15 is a schematic diagram schematically showing a hardware architecture of a computer device suitable for implementing a multilevel-cache-based data processing method according to Embodiment 3 of the present application.

FIG. 15 is a schematic diagram schematically showing a hardware architecture of a computer device 10000 suitable for implementing a multilevel-cache-based data processing method according to Embodiment 3 of the present application. In this embodiment, the computer device 10000 may be a server computing device 4 or a part of a CDN server computing device 4. In this embodiment, the computer device 10000 may be a device capable of automatically performing numerical calculation and/or information processing according to preset or prestored instructions. For example, the computer device may be a rack server computing device, a blade server computing device, a tower server computing device, or a cabinet server computing device (including an independent server computing device or a server computing device cluster including a plurality of server computing devices). As shown in FIG. 15, the computer device 10000 includes, but is not limited to a memory 10010, a processor 10020, and a network interface 10030 that may be communicatively linked to each other through a system bus.

The memory 10010 includes at least one type of computer-readable storage medium. The readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 10010 may be an internal storage module of the computer device 10000, for example, a hard disk or an internal memory of the computer device 10000. In some other embodiments, the memory 10010 may alternatively be an external storage device of the computer device 10000, for example, a plug-in hard disk, a smart media card (SMC for short), a secure digital (SD for short) card, or a flash card on the computer device 10000. Certainly, the memory 10010 may alternatively include both an internal storage module and an external storage device of the computer device 10000. In this embodiment, the memory 10010 is generally configured to store an operating system and various types of application software installed on the computer device 10000, for example, program code for the multilevel-cache-based data processing method. In addition, the memory 10010 may be further configured to temporarily store various types of data that have been output or are to be output.

In some embodiments, the processor 10020 may be a central processing unit (CPU for short), a controller, a microcontroller, a microprocessor, or another data processing chip. The processor 10020 is generally configured to control overall operation of the computer device 10000, for example, execute control, processing, and the like related to data interaction or communication with the computer device 10000. In this embodiment, the processor 10020 is configured to run program code stored in the memory 10010 or to process data.

The network interface 10030 may include a wireless network interface or a wired network interface. The network interface 10030 is generally configured to establish a communication link between the computer device 10000 and another computer device. For example, the network interface 10030 is configured to connect the computer device 10000 to an external terminal through a network, and establish a data transmission channel, a communication link, and the like between the computer device 10000 and the external terminal. The network may be a wireless or wired network, for example, Intranet, Internet, the Global System for Mobile Communications (GSM for short), wideband code division multiple access (WCDMA for short), a 4G network, a 5G network, Bluetooth, or Wi-Fi.

It should be noted that FIG. 15 shows only a computer device having components 10010 to 10030. However, it should be understood that not all of the shown components are required to be implemented, and more or fewer components may be implemented instead.

In this embodiment, the multilevel-cache-based data processing method stored in the memory 10010 may alternatively be divided into one or more program modules and executed by one or more processors (the processor 10020 in this embodiment) to implement this embodiment of the present application.

Embodiment 4

The present application further provides a computer-readable storage medium applied to a server computing device. The server computing device includes a first-level cache and a second-level cache. The first-level cache includes a plurality of first-type storage nodes. The second-level cache includes a plurality of second-type storage nodes. Computer-readable instructions are stored on the computer-readable storage medium. When the computer-readable instructions are executed by a processor, the following steps are implemented:

selecting a target node through a current hash ring in response to a read request;

determining whether the target node is any one of the plurality of first-type storage nodes; and if the target node is not any one of the plurality of first-type storage nodes, reading, from the plurality of second-type storage nodes, response data for responding to the read request, and returning the response data.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, for example, a hard disk or an internal memory of the computer device. In some other embodiments, the computer-readable storage medium may alternatively be an external storage device of a computer device, for example, a plug-in hard disk, a smart media card (SMC for short), a secure digital (SD for short) card, or a flash card on the computer device. Certainly, the computer-readable storage medium may alternatively include both an internal storage unit and an external storage device of a computer device. In this embodiment, the computer-readable storage medium is generally configured to store an operating system and various types of application software installed in the computer device, for example, program code for the multilevel-cache-based data processing method in this embodiment. In addition, the computer-readable storage medium may be further configured to temporarily store various types of data that have been output or are to be output.

It is clear to those skilled in the art that the various modules or steps in the above embodiments of the present application may be implemented by a general-purpose computing apparatus, and may be centralized on a single computing apparatus or distributed on a network formed by a plurality of computing apparatuses. Optionally, the various modules or steps may be implemented by using program code executable by the computing apparatus, such that they may be stored in a storage apparatus and executed by the computing apparatus, and in some cases, the steps shown or described may be performed in a sequence different from that described herein, or they may be respectively fabricated into various integrated circuit modules, or a plurality of modules or steps thereof may be implemented as a single integrated circuit module. In this way, the embodiments of the present application are not limited to any specific combination of hardware and software.

It should be noted that, the technical solutions of the present application is mainly/specifically aimed at optimization of a Web player based on DASH streaming media. In addition, the foregoing descriptions are merely preferred embodiments of the present application, and are not intended to limit the patent protection scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A method of processing data based on multilevel caches, applied to a server computing device, wherein the server computing device comprises a first-level cache and a second-level cache, wherein the first-level cache comprises a plurality of first-type storage nodes, wherein the second-level cache comprises a plurality of second-type storage nodes, and wherein the method comprises:

identifying a target node based on a current hash ring in response to receiving a read request;

determining whether the target node is any one of the plurality of first-type storage nodes;

in response to determining that the target node is not any one of the plurality of first-type storage nodes, reading response data from the second-level cache, wherein the response data comprises data for responding to the read request; and transmitting the response data in response to the read request.

2. The method according to claim 1, further comprising: updating the current hash ring at a predetermined frequency.

3. The method according to claim 1, wherein the current hash ring is a first hash ring; and wherein the method comprises:

updating the current hash ring from the first hash ring to a second hash ring based on a current status of each of the plurality of first-type storage nodes.

4. The method according to claim 3, wherein the current status of each of the plurality of first-type storage nodes comprises a current disk status value of each of the plurality of first-type storage nodes; and wherein the updating the current hash ring from the first hash ring to a second hash ring based on a current status of each of the plurality of first-type storage nodes comprises:

constructing a new hash ring;

determining the current disk status value of each of the plurality of first-type storage nodes;

generating the second hash ring based on the new hash ring and the current disk status value of each of the plurality of first-type storage nodes; and updating the current hash ring from the first hash ring to the second hash ring.

5. The method according to claim 4, wherein the determining the current disk status value of each of the plurality of first-type storage nodes comprises:

determining the current disk status value of each of the plurality of first-type storage nodes based on IO queues of each of the plurality of first-type storage nodes and a request latency of each of the plurality of first-type storage nodes.

6. The method according to claim 4, wherein the determining the current disk status value of each of the plurality of first-type storage nodes comprises:
determining whether a number of IO queues of an $i^{th}$ storage node is greater than a first predetermined value, wherein the $i^{th}$ storage node is any one of the plurality of first-type storage nodes, $1 \leq i \leq M$, i is an integer, and M represents a number of the plurality of first-type storage nodes;
decrementing a current disk status value of the $i^{th}$ storage node by 1 in response to determining that the number of IO queues of the $i^{th}$ storage node is greater than the first predetermined value;
obtaining a request latency of the $i^{th}$ storage node in response to determining that the number of IO queues of the $i^{th}$ storage node is not greater than the first predetermined value;
decrementing the current disk status value of the $i^{th}$ storage node by 1 in response to determining that the request latency of the $i^{th}$ storage node is greater than a second predetermined value; and
incrementing the current disk status value of the $i^{th}$ storage node by 1 in response to determining that the request latency of the $i^{th}$ storage node is not greater than the second predetermined value.

7. The method according to claim 4, wherein the generating the second hash ring based on the new hash ring and the current disk status value of each of the plurality of first-type storage nodes comprises:
inserting node information of an $i^{th}$ storage node to N positions of the new hash ring based on the current disk status value of the $i^{th}$ storage node, wherein a value of N is equal to the current disk status value of the $i^{th}$ storage node, the $i^{th}$ storage node is any one of the plurality of first-type storage nodes, $1 \leq i \leq M$, i is an integer, and M represents a number of the plurality of first-type storage nodes.

8. The method according to claim 1, wherein the server computing device further comprises an internal memory; and wherein the identifying a target node based on a current hash ring in response to receiving a read request comprises:
determining whether there is the response data in the internal memory based on the read request; and
determining the target node based on the current hash ring in response to determining that there is not the response data in the internal memory.

9. The method according to claim 1, further comprising:
in response to determining that the target node is one of the plurality of first-type storage nodes, determining whether there is the response data in the one of the plurality of first-type storage nodes;
in response to determining that there is the response data in the one of the plurality of first-type storage nodes, reading the response data from the one of the plurality of first-type storage nodes; and
in response to determining that there is not the response data in the one of the plurality of first-type storage nodes, reading the response data from the second-level cache.

10. The method according to claim 1, wherein the plurality of first-type storage nodes correspond to a plurality of SSD disks; and wherein the plurality of second-type storage nodes correspond to a plurality of HDD disks.

11. A system of processing data based on multilevel caches, applied to a server computing device, wherein the server computing device comprises a first-level cache and a second-level cache, wherein the first-level cache comprises a plurality of first-type storage nodes, wherein the second-level cache comprises a plurality of second-type storage nodes, and wherein the system comprises a processor and a memory, the memory storing computer-readable instructions that upon execution by the processor cause the processor to implement operations comprising:
identifying a target node based on a current hash ring in response to receiving a read request;
determining whether the target node is any one of the plurality of first-type storage nodes;
reading response data from the second-level cache in response to determining that the target node is not any one of the plurality of first-type storage nodes, wherein the response data comprises data for responding to the read request; and
transmitting the response data in response to the read request.

12. The system according to claim 11, wherein the operations further comprise:
updating the current hash ring at a predetermined frequency.

13. The system according to claim 11, wherein the current hash ring is a first hash ring; and wherein operations further comprise:
updating the current hash ring from the first hash ring to a second hash ring based on a current status of each of the plurality of first-type storage nodes.

14. The system according to claim 13, wherein the current status of each of the plurality of first-type storage nodes comprises a current disk status value of each of the plurality of first-type storage nodes; and wherein updating the current hash ring from the first hash ring to a second hash ring based on a current status of each of the plurality of first-type storage nodes comprises:
constructing a new hash ring;
determining the current disk status value of each of the plurality of first-type storage nodes;
generating the second hash ring based on the new hash ring and the current disk status value of each of the plurality of first-type storage nodes; and
updating the current hash ring from the first hash ring to the second hash ring.

15. The system according to claim 14, wherein operations further comprise:
determining the current disk status value of each of the plurality of first-type storage nodes based on IO queues of each of the plurality of first-type storage nodes and a request latency of each of the plurality of first-type storage nodes.

16. The system according to claim 14, wherein the determining the current disk status value of each of the plurality of first-type storage nodes further comprises:
determining whether a number of IO queues of an $i^{th}$ storage node is greater than a first predetermined value, wherein the $i^{th}$ storage node is any one of the plurality of first-type storage nodes, $1 \leq i \leq M$, i is an integer, and M represents a number of the plurality of first-type storage nodes;

decrementing a current disk status value of the $i^{th}$ storage node by 1 in response to determining that the number of IO queues of the $i^{th}$ storage node is greater than the first predetermined value;

obtaining a request latency of the $i^{th}$ storage node in response to determining that the number of IO queues of the $i^{th}$ storage node is not greater than the first predetermined value;

decrementing the current disk status value of the $i^{th}$ storage node by 1 in response to determining that the request latency of the $i^{th}$ storage node is greater than a second predetermined value; and incrementing the current disk status value of the $i^{th}$ storage node by 1 in response to determining that the request latency of the $i^{th}$ storage node is not greater than the second predetermined value.

17. The system according to claim 14, wherein the generating the second hash ring based on the new hash ring and the current disk status value of each of the plurality of first-type storage nodes further comprises:

inserting node information of an $i^{th}$ storage node to N positions of the new hash ring based on the current disk status value of the $i^{th}$ storage node, wherein a value of N is equal to the current disk status value of the $i^{th}$ storage node, the $i^{th}$ storage node is any one of the plurality of first-type storage nodes, $1 \leq S_i \leq M$, i is an integer, and M represents a number of the plurality of first-type storage nodes.

18. The system according to claim 11, wherein the server computing device further comprises an internal memory; and wherein the identifying a target node based on a current hash ring in response to receiving a read request comprises:

determining whether there is the response data in the internal memory based on the read request; and determining the target node based on the current hash ring in response to determining that there is not the response data in the internal memory.

19. A non-transitory computer-readable storage medium, storing computer-readable instructions executable by a server computing device, wherein the server computing device comprises a first-level cache and a second-level cache, wherein the first-level cache comprises a plurality of first-type storage nodes, wherein the second-level cache comprises a plurality of second-type storage nodes, and wherein the computer-readable instructions, when executed by the server computing device, cause the server computing device to perform operations comprising:

identifying a target node based on a current hash ring in response to receiving a read request;

determining whether the target node is any one of the plurality of first-type storage nodes;

reading response data from the second-level cache in response to determining that the target node is not any one of the plurality of first-type storage nodes, wherein the response data comprises data for responding to the read request; and transmitting the response data in response to the read request.

20. The non-transitory computer-readable storage medium according to claim 19, the operations further comprising:

updating the current hash ring from a first hash ring to a second hash ring based on a current status of each of the plurality of first-type storage nodes, wherein the current status of each of the plurality of first-type storage nodes comprises a current disk status value of each of the plurality of first-type storage nodes, and wherein the updating the current hash ring from a first hash ring to a second hash ring further comprises:

constructing a new hash ring, determining the current disk status value of each of the plurality of first-type storage nodes, generating the second hash ring based on the new hash ring and the current disk status value of each of the plurality of first-type storage nodes, and updating the current hash ring from the first hash ring to the second hash ring.

* * * * *